(12) United States Patent
Mylavarapu

(10) Patent No.: US 11,429,479 B2
(45) Date of Patent: Aug. 30, 2022

(54) MEMORY DEVICE ACTIVITY-BASED COPYING DEFECT MANAGEMENT DATA

(71) Applicant: Micron Technology, Inc., Boise, ID (US)

(72) Inventor: Sai Krishna Mylavarapu, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 222 days.

(21) Appl. No.: 16/931,178

(22) Filed: Jul. 16, 2020

(65) Prior Publication Data

US 2022/0019502 A1 Jan. 20, 2022

(51) Int. Cl.
| | |
|---|---|
| *G06F 11/10* | (2006.01) |
| *G06F 11/07* | (2006.01) |
| *G06F 12/02* | (2006.01) |
| *G06F 11/30* | (2006.01) |

(52) U.S. Cl.
CPC ........ *G06F 11/1068* (2013.01); *G06F 11/076* (2013.01); *G06F 11/3037* (2013.01); *G06F 12/0246* (2013.01); *G06F 12/0253* (2013.01)

(58) Field of Classification Search
CPC . G06F 11/1068; G06F 11/076; G06F 11/3037
See application file for complete search history.

(56) References Cited

U.S. PATENT DOCUMENTS

| | | | | |
|---|---|---|---|---|
| 6,078,520 A | * | 6/2000 | Tobita ................ | G06F 12/0866 365/185.11 |
| 7,051,260 B2 | * | 5/2006 | Ito ....................... | G11C 7/1045 714/763 |
| 7,594,087 B2 | * | 9/2009 | Zeevi .................. | G06F 12/0246 711/3 |
| 8,074,034 B2 | * | 12/2011 | Sartore ................ | G11C 11/005 714/24 |
| 8,185,690 B2 | * | 5/2012 | Miura .................. | G11C 7/20 711/111 |
| 9,547,459 B1 | * | 1/2017 | BenHanokh .......... | G06F 3/065 |
| 11,237,894 B1 | * | 2/2022 | Baum ................... | G06F 11/0721 |
| 2004/0221142 A1 | * | 11/2004 | Beckert ............... | G06F 12/08 714/1 |
| 2013/0013651 A1 | * | 1/2013 | Shuma ................ | G06F 16/211 707/E17.106 |

* cited by examiner

*Primary Examiner* — Amine Riad
(74) *Attorney, Agent, or Firm* — Schwegman Lundberg & Woessner, P.A.

(57) ABSTRACT

Various embodiments described herein provide for copying (e.g., to cache) a portion of defect management data for a block of a memory device, such as a non-volatile memory device of a memory sub-system, based on activity of the memory device. For instance, the portion of defect management data can be copied from a first-type memory device of the memory sub-system to a second-type memory device of the memory sub-system, where the first-type memory device stores defect management data for a working set of blocks of the non-volatile memory device being operated upon by the memory sub-system, where the second-type memory device is used to store defect management data for an active block of the working set of blocks, and where the second-type memory device has a faster access (e.g., read or write access) than the first-type memory device.

20 Claims, 8 Drawing Sheets

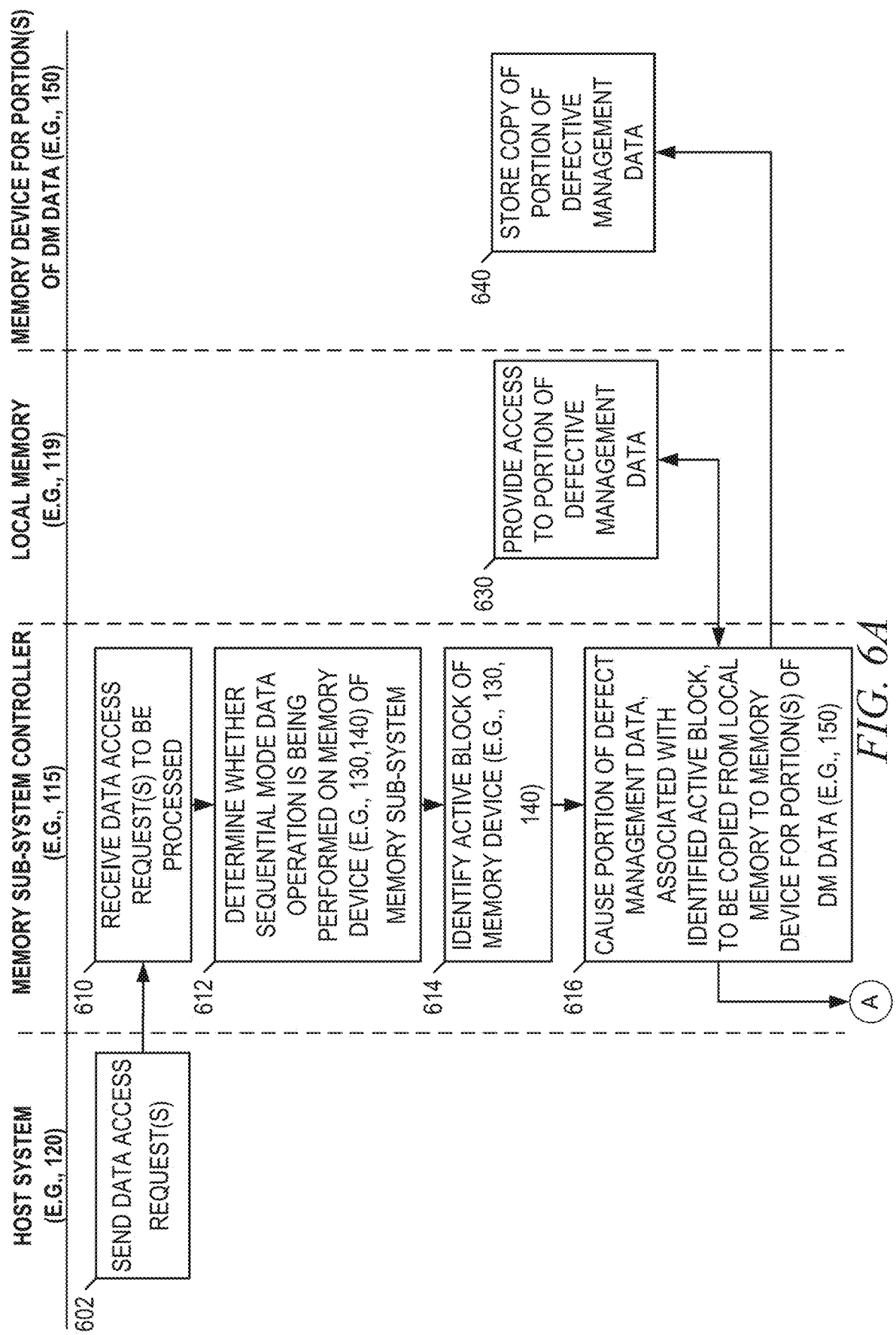

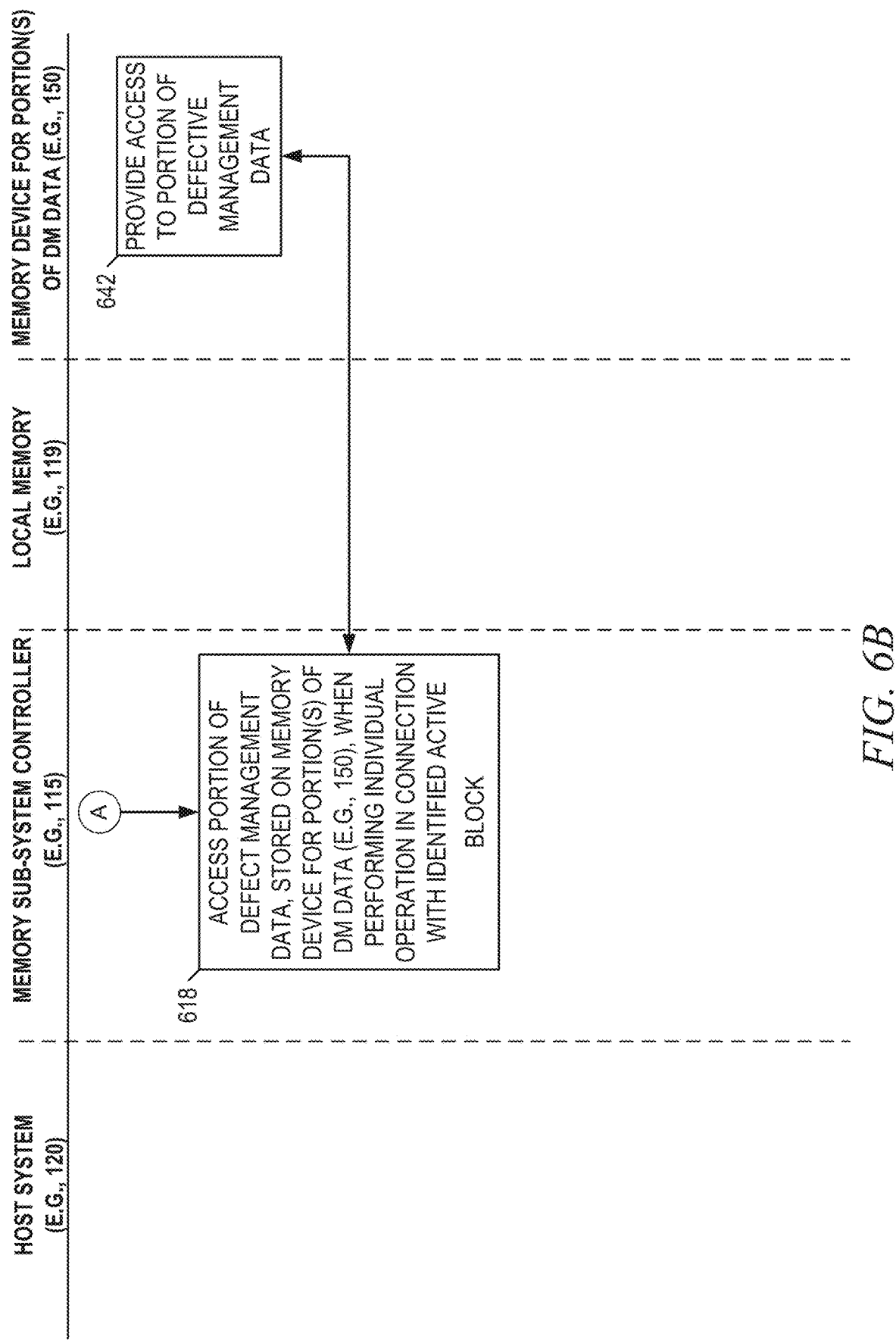

MEMORY DEVICE ACTIVITY-BASED COPYING DEFECT MANAGEMENT DATA

TECHNICAL FIELD

Embodiments of the disclosure relate generally to memory devices, and more specifically, relate to copying a portion of defect management data for a block of a memory device based on activity of the memory device, such as a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 6A and 6B provide an interaction diagram illustrating interactions between components of a computing environment in the context of some embodiments in which a method for copying a portion of defect management data for a block of a memory device as described herein is performed.

DETAILED DESCRIPTION

Figure 1:
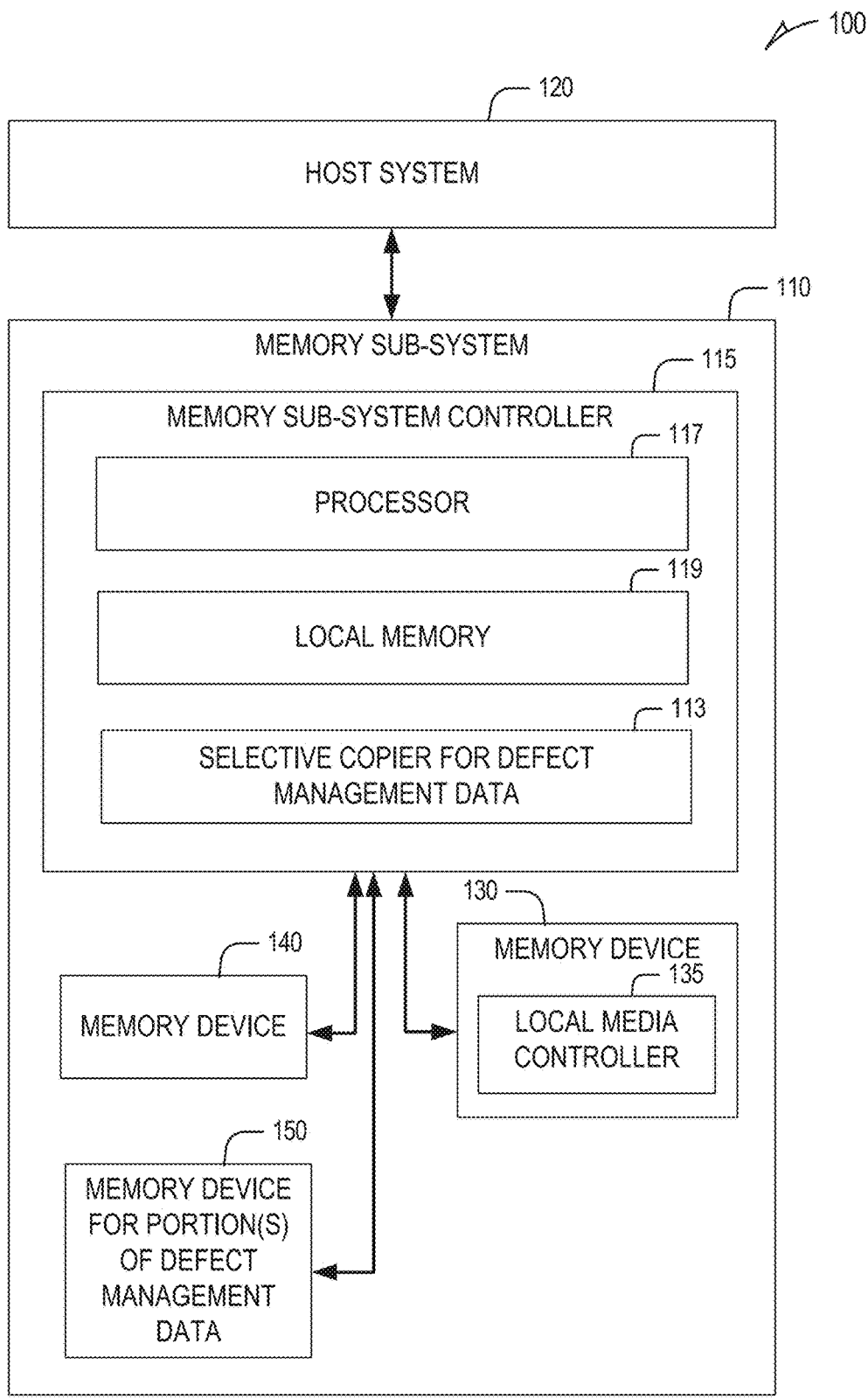
FIG. 1 is a block diagram illustrating an example computing system that includes a memory sub-system in accordance with some embodiments of the present disclosure.

Aspects of the present disclosure are directed to copying (e.g., to cache) a portion of defect management data for a block of a memory device based on activity of the memory device, such as a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Within certain memory devices, such as a three-dimensional cross-point memory device, memory cells are grouped together contiguously as tiles, and circuitry for those memory cells (e.g., wordline drivers and bitline drivers) are arranged/organized according to tiles. Due to this topology, tile failure can be a failure mode suffered by such memory devices. Traditionally, memory sub-systems include one or more defect management schemes to handle failures at a memory cell group level (e.g., tile failures, block failure, or the like). For instance, some conventional defect management schemes (e.g., tile failure handling) involve maintaining and using defect management data (e.g., one or more "bad tile" defectivity tables) to store details of failures of one or more memory cell groups. Often, the data management data currently being used is stored and accessed from a certain type of volatile memory, such as a dynamic random access memory (DRAM), of a memory sub-system. However, the use of volatile memory such as DRAM to access defect management data can lead to a data bandwidth bottleneck for the memory sub-system and can also lead to undesirable power consumption by the memory sub-system (power consumption that is commensurate with the number of DRAM accesses for the defect management data). For example, operating on a current active block (hereafter, active block) of a memory device (e.g., non-volatile memory device) can traditionally result in several DRAM accesses of the defect management data for the defect management data. This can be particularly undesirable and inefficient for certain memory devices, such as three-dimensional cross-point memory devices, where the defect management data for the active block can be quite small compared to all the defect management data stored on the DRAM, and where the defect management data for the active block may need to be accessed often.

Aspects of the present disclosure address the above and other deficiencies by copying a portion of defect management data for a block of a memory device, such as a non-volatile memory device of a memory sub-system, based on activity of the memory device. In particular, the copying based on activity of the memory device can facilitate selective copying of one or more portions of defect management data based on the activity, which in turn can enable caching of a portion of the defective management data for an individual block of the memory device when the individual block is active (e.g., actively being accessed by the memory sub-system). With respect to a first-type memory device (e.g., non-volatile memory device, such as a three-dimensional cross-point memory device) of a memory sub-system, various embodiments enable the memory sub-system to copy, from a second-type memory device (e.g., from volatile memory device) to a third-type memory device (e.g., another type volatile memory device), a portion of defect management data for an individual block of the first-type memory device based on activity (e.g., operational data mode, such as a sequential or random data access) of the first-type memory device. Depending on the embodiment, the activity of the first-type memory device can be determined (e.g., by a memory sub-system controller) based on data access requests (e.g., read or write requests) to a memory sub-system from a host system. In particular, analysis of the data access requests can determine a workload characteristic of memory sub-system. Based on the activity of the third-type memory device, such embodiments can selectively cache a portion (e.g., one or more partial tables/fractions of a full table) of defect management data that relates to an active block on the third-type memory device, where the third-type memory device provides faster access (e.g., faster read access) than the second-type memory device used to store larger portions of the defect management data (e.g., used to store the defect management data for a working set of blocks of the first-type memory device recently accessed or currently being operated upon by the memory sub-system). For some embodiments, the third-type memory device used to cache the portion of the defect management data comprises a static random access memory (SRAM) device, while the second-type memory device used to store larger portions of the defect management data (e.g., full tables) comprises a dynamic random access memory (DRAM) device.

As used herein, a working set of blocks of a first-type memory device (e.g., non-volatile memory device) of a memory sub-system can comprise one or more blocks currently being operated upon by the memory sub-system or associated with a set of memory addresses currently being operated upon by the memory sub-system. For instance, the working set of blocks can comprise those blocks of an area or active region of the non-volatile memory device (a tile of a three-dimensional cross-point memory device) currently being operating upon by the memory sub-system. Additionally, as used herein, a current active block (or active block) can comprise an individual block of the working set of blocks that is currently being accessed (e.g., read or write accessed) by the memory sub-system. The defect management data for blocks of the first-type memory device can be persistently stored on the first-type memory device (to preserve the defect management data between power cycles of the memory sub-system), and some or all of the defect management data (e.g., defect management data for the working set of blocks) can be copied to the second-type memory device over time during operation of the memory sub-system.

According to some embodiments, a memory sub-system comprises: a first volatile memory device that performs faster than the first volatile memory device, such as a static random access memory (SRAM) device; a second volatile memory device, such as a dynamic random access memory (DRAM) device; and a non-volatile memory device, such as a non-volatile memory device that does not have an erase-before rewrite requirement. Examples of the non-volatile memory devices can include, without limitation, ferroelectric random access memory (FeRAM) devices, resistive random access memory (RRAM) devices, three-dimensional cross-point memory devices, and phase-change memory devices. According to some embodiments, defect management data (e.g., metadata) associated with the non-volatile memory device (e.g., associated with a working set of blocks of the first-type memory device recently accessed or currently being operated upon by the memory sub-system) is stored on the second volatile memory device. Depending on the embodiment, the defect management data can be stored in a defect management structure, such as a table, where a portion of the defect management data can comprise sub-structure (e.g., partial table or fraction of a full table). The defect management data can comprise, for example, data regarding raw bit error (RBER) or data regarding code word error rate for an individual block of the non-volatile memory device. During operation, the defect management structure (e.g., table) can be retrieved from the second volatile memory device, and the retrieved defect management structure can be divided (e.g., broken down) into two or more defect management sub-structures (e.g., partial tables/fractions of a full table) based on activity (e.g., a set of workload characteristics) of the non-volatile memory device. Subsequently, at least one of the defect management sub-structures can be selectively cached on the first volatile memory device based on the activity of the non-volatile memory device. In this way, various embodiments can break down defect management structures and selectively cache the resulting sub-structures on a volatile memory device (e.g., SRAM device) that is faster than a volatile memory device (e.g., DRAM device) used to store the defect management structures in their entirety. This can enable a memory sub-system controller to quickly access a localized, sliver of the defect management structure from fast volatile memory (e.g., SRAM), and avoid having to access the defect management structures stored on slow volatile memory (e.g., DRAM). For instance, some embodiments can copy a portion of defect management data (e.g., metadata) for an active block from a DRAM device to a SRAM device, and avoid accessing the DRAM for additional defect management data until the next active block is operated upon.

Use of various embodiments provides efficient handling of defects within a memory sub-system, which can improve the memory sub-system's reliability over conventional memory sub-systems. For instance, an embodiment can improve reliability of a memory sub-system (e.g., solid-state drive (SSD)) comprising sequentially managed non-volatile memory devices. The non-volatile memory device can comprise a non-volatile memory device that does not have an erase-before rewrite requirement, which can include, without limitation, ferroelectric random access memory (Fe-RAM), resistive random access memory (RRAM), three-dimensional cross-point memory device, and phase-change memory device. Compared to conventional memory sub-systems, various embodiments can improve failure handling capability of a non-volatile memory device (e.g., three-dimensional cross-point memory device) of a memory sub-system while avoiding data bandwidth limits or increased power consumption issues (e.g., from using DRAM alone to access defect management data).

Disclosed herein are some examples of systems for copying a portion of defect management data for a block of a memory device based on activity of the memory device, as described herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. As shown the memory sub-system 110 can include a memory device 150 for (storing) one or more portions of defect management data (hereafter, the method device 150), where the memory device 150 is separate from the memory sub-system controller 115, and the memory devices 130, 140.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance). Internet of Things (IoT) enabled device, embedded computer (e.g., one included in a vehicle, industrial equipment, or a networked commercial device), or such computing device that includes memory and a processing device.

The computing environment 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein. "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS). Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs. TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a selective copier 113 for defect management data (hereafter, the selective copier 113) that enables or facilitates copying a portion of defect management data for a block (e.g., active block) of a memory device (e.g., 130, 140) based on activity of the memory device (e.g., 130, 140). In particular, for some embodiments, the selective copier 113 enables the memory sub-system controller 115 to copy a portion of defect management data, for a block (e.g., active block) of a memory device (e.g., 130, 140), from first memory device that stores defect management data (e.g., a full table of defect management data) to a second memory device that can store one or more portions of the defect management data (e.g., one or more fractions of the full table) for faster data access (e.g., read or write access) than the first memory device. For instance, the first memory device can comprise a first-type volatile memory device, and the second memory device can comprise a second-type volatile memory device that provides faster data access than the first-type volatile memory device. As described herein, storing one or more portions of the defect management data on the faster, second memory device can facilitate caching of a portion of the defect management data for an active block of the memory device (e.g., 130, 140). In context of the memory sub-system 110, the local memory 119 can serve as the first memory device, and the memory device 150 can serve as the second memory device.

Depending on the embodiment, activity of the memory device (e.g., 130, 140) can comprise a set of workload characteristics of the memory device (e.g., 130, 140), which can be determined based on analysis of one or more data requests (e.g., read or write requests) received by the memory sub-system 110 from the host system 120. The activity of the memory device can indicate whether a sequential mode data operation is being performed on the memory device (e.g., 130, 140). In response to determining that a sequential mode data operation is being performed on the memory device, the selective copier 113 can cause (e.g., trigger) a portion of defect management data for an individual (e.g., active block) of the memory device (e.g., 130, 140) to be copied from the local memory 119 to the memory device 150. Examples of sequential modes of data operation that can cause the copy can include, without limitation, one or more of the following: sequential host writes by the host system 120, where writes can be serialized and localized to an active block of the memory device (e.g., 130, 140); sequential host reads by the host system 120, where reads can be serialized and localized to an active block of the memory device (e.g., 130, 140); background reads (e.g., by the memory sub-system controller 115), such as during a garbage collection operation, a refresh operation, or a defect management operation performed on an active block; and background writes (e.g., by the memory sub-system controller 115), such as during a garbage collection operation, a refresh operation, or a defect management operation performed on an active block. Additionally, for some embodiments, the selective copier 113 causes a portion of defect management data for an individual (e.g., active block) of the memory device (e.g., 130, 140) to be copied from the local memory 119 to the memory device 150 in response to determining that a set of random host write operations are being performed on the memory device (e.g., 130, 140), as random host write operations can still be localized to an active block.

According to some embodiments, the selective copier 113 causes a portion of defective management data for a first individual block of the memory device (e.g., 130, 140) to be copied from the local memory 119 to the memory device 150 when the first individual block becomes the active block of the memory sub-system 110 and, subsequently, causes another portion of defective management data for a second individual block of the memory device of the memory device (e.g., 130, 140) to be copied from the local memory 119 to the memory device 150 when the second individual block becomes the (next) active block of the memory sub-system 110. In this way, at a given moment, the memory device 150 can at least store a portion of defective management data for the active block.

Figure 2:
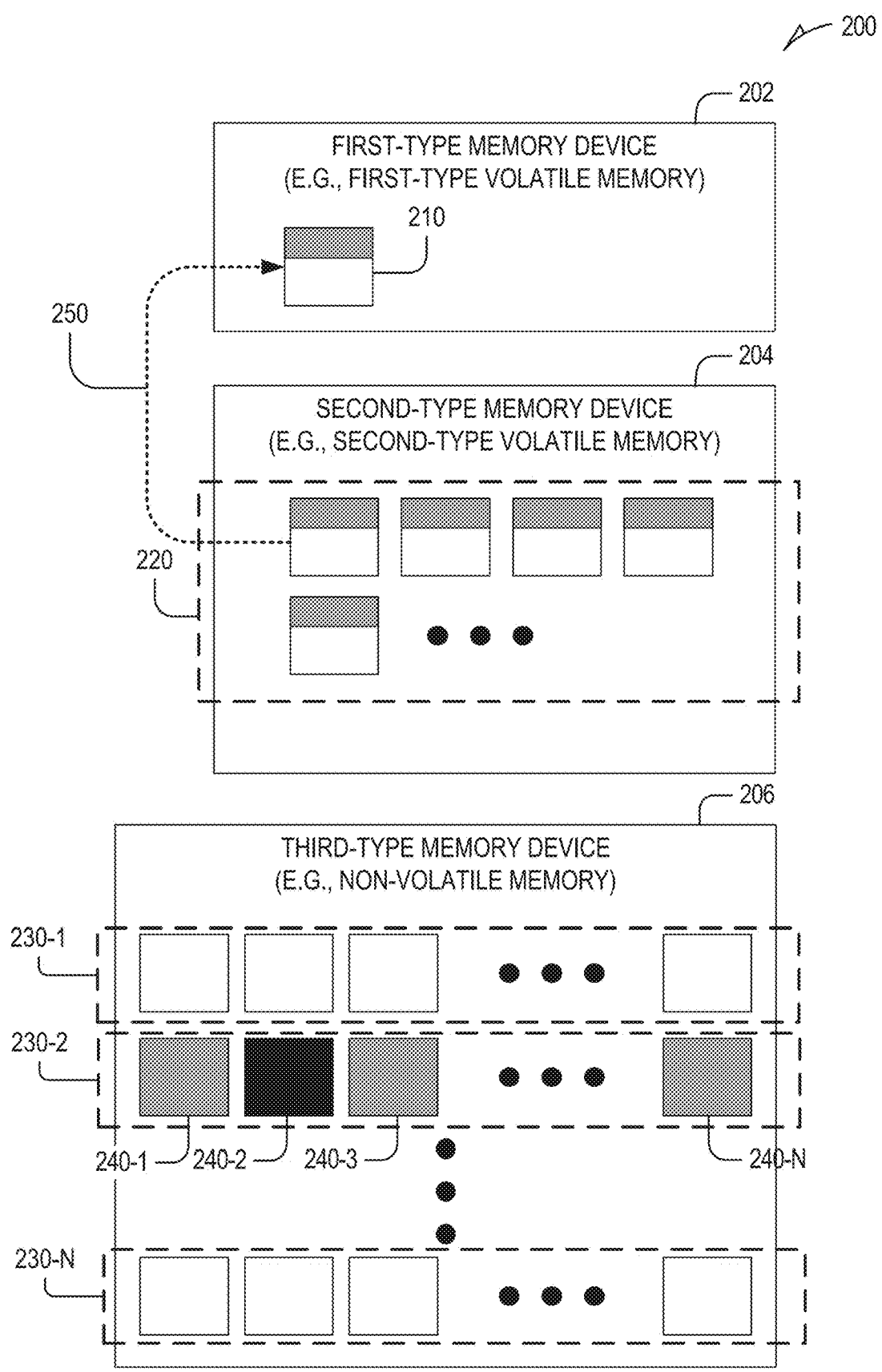
FIG. 2 is a block diagram illustrating an example of copying a portion of defect management data for a block of a memory device based on activity of the memory device, in accordance with some embodiments of the present disclosure.

FIG. 2 is a block diagram illustrating an example of copying a portion of defect management data for a block of a memory device based on activity of the memory device, in accordance with some embodiments of the present disclosure. In particular, FIG. 2 illustrates a memory sub-system 200 that comprises a first-type memory device 202, a second-type memory device 204, and a third-type memory device 206. According to some embodiments, the first-type memory device 202 comprises a first-type volatile memory device, such as a DRAM device, and the second-type memory device comprises a second-type volatile memory device that has faster access (e.g., read or write access) than the first-type volatile memory device such as a SRAM device. Though various embodiments are described herein with respect to DRAM and SRAM devices, other memory device configurations for some embodiments. Additionally, for some embodiments, the third-type memory device 206 comprises a non-volatile memory device, such as a FeRAM device, a RRAM device, a three-dimensional cross-point memory device, or a phase-change memory device. For some embodiments, the third-type memory device 206 comprises a non-volatile memory device that does not have an erase-before rewrite requirement. For some embodiments, the third-type memory device 206 comprises a plurality of individual blocks 230-1 through 230-N. As shown, the individual block 230-2 can comprise a plurality of pages 240-1 through 240-N.

In FIG. 2, the individual block 230-2 can represent an active block of the third-type memory device 206, and the other individual blocks (e.g., 230-1, 230-N) can represent dormant blocks of the third-type memory device 206, and the page 240-2 can represent a current page within the individual block 230-2. The second-type memory device 204 can store defect management data 220 (e.g., defect management metadata) for a plurality of individual blocks of the third-type memory device 206. The defect management data 220 can be stored on the second-type memory device 204 in a defect management structure, such as a table. The first-type memory device 202 can store at least a portion of the defect management data 220 for an active block (e.g., 230-2) of the third-type memory device 206. A portion of the defect management data 220 stored on the first-type memory device 202 can comprise a partial table or a fraction of the full table stored on the second-type memory device 204.

During operation of the memory sub-system 200, an embodiment can analyze activity of the third-type memory device 206 and determine whether a sequential mode data operation (e.g., sequential or random host writes, sequential host reads, background reads, or background writes) is being performed on the third-type memory device 206. In response to determining that a sequential mode data operation is being performed on the third-type memory device 206, an embodiment can identify an active block (e.g., 230-2) of the third-memory device 206 and, as shown, can cause a portion 210 of the defect management data 220 to be copied (250) from the second-type memory device 204 to the first-type memory device 202.

Figure 3:
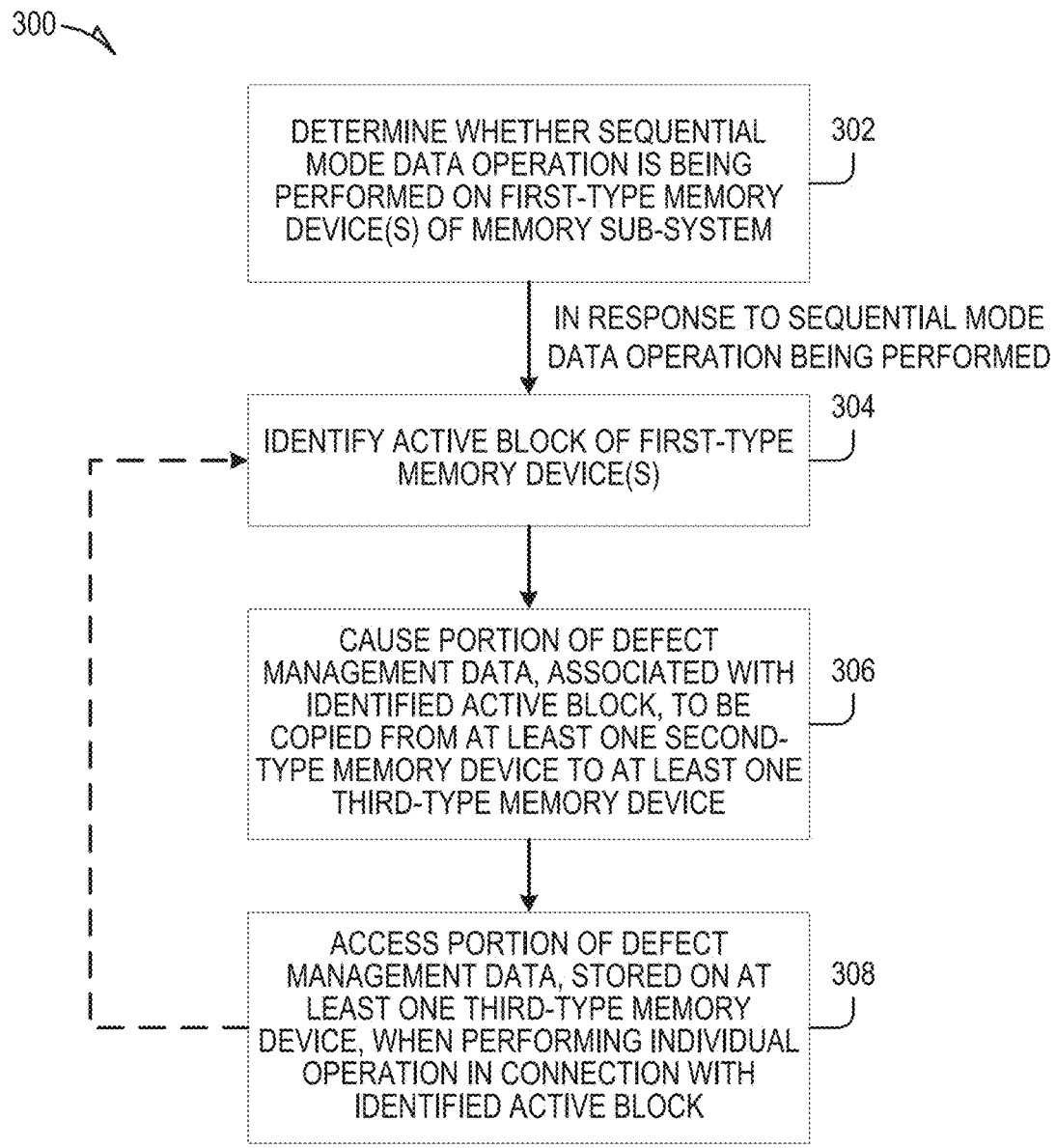
FIGS. 3 through 5 are flow diagrams of example methods for copying a portion of defect management data for a block of a memory device based on activity of the memory device, in accordance with some embodiments of the present disclosure.
Figure 4:
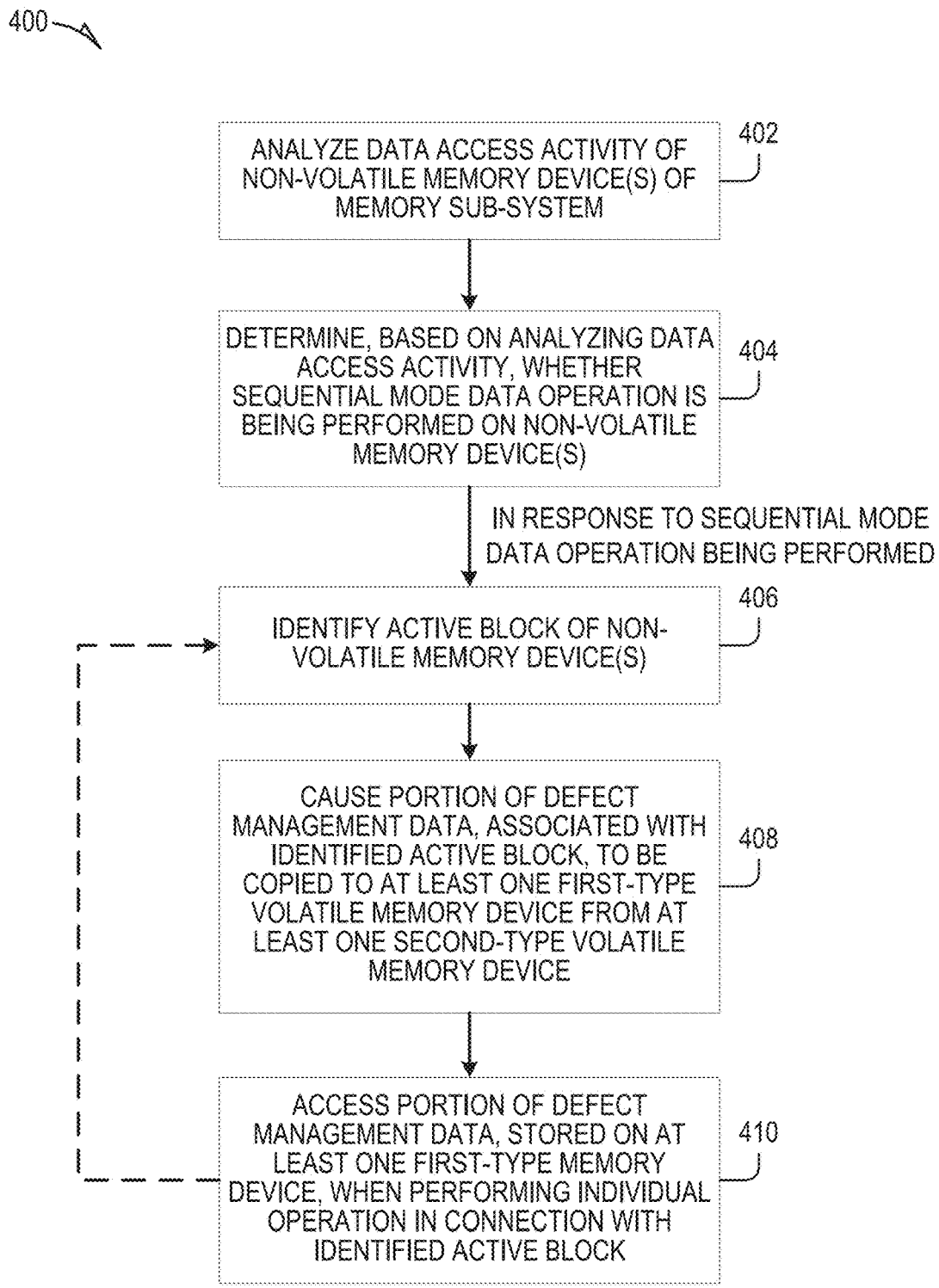
Figure 5:
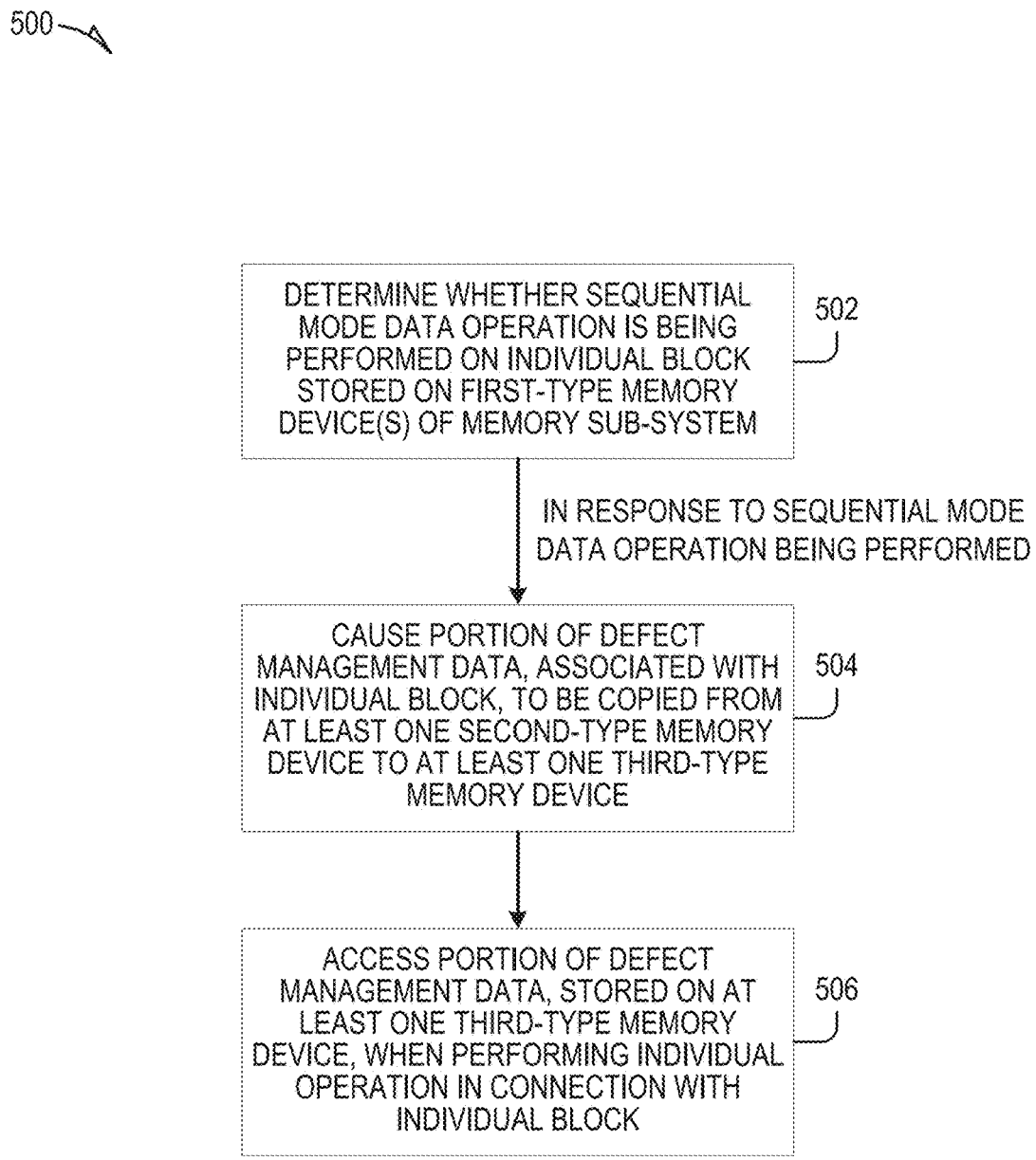

FIGS. 3 through 5 are flow diagrams of example methods for copying a portion of defect management data for a block of a memory device based on activity of the memory device, in accordance with some embodiments of the present disclosure. The methods 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 300, 400, 500 is performed by the memory sub-system controller 115 of FIG. 1 based on the selective copier 113. Additionally, or alternatively, for some embodiments, at least one of the methods 300, 400, 500 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 300 of FIG. 3, at operation 302, a processing device (e.g., the processor 117 of the memory sub-system controller 115) determines whether a sequential mode data operation is being performed on a set of first-type memory devices (e.g., 130, 140). For some embodiments, each of the first-type memory devices comprises a non-volatile memory device that does not have an erase-before rewrite requirement. An example of the first-type memory device can include, without limitation, a FeRAM device, a RRAM device, a three-dimensional cross-point memory device, and a phase-change memory device.

Depending on the embodiment, the sequential mode data operation can comprise at least one of a set of sequential host write operations or a set of sequential host read operations. For example, a sequential host write operation can comprise sequential (or random) host writes by a host system (e.g., 120), where writes can be serialized and localized to an active block of the memory device (e.g., 130, 140). As another example, a sequential host read operation cam comprise sequential host reads by a host system (e.g., 120), where reads can be serialized and localized to an active block of the memory device (e.g., 130, 140). The sequential mode data operation can comprise at least one of a set of background read operations or a set of background write operations. For example, a background read operation can be a read operation performed during a garbage collection operation, a refresh operation, or a defect management operation performed on an active block. Likewise, a background write operation can comprise a write operation performed during a garbage collection operation, a refresh operation, or a defect management operation performed on an active block. Accordingly, the sequential mode data operation can comprise at least one of a set of garbage collection operations, a set of refresh operations, or a set of defect management operations.

In response to determining (at operation 302) that the sequential mode data operation is being performed on the set of first-type memory devices (e.g., 130, 140), the processing device (e.g., 117) performs operations 304, 306, and 308.

At operation 304, the processing device (e.g., 117) identifies an active block of the set of first-type memory devices (e.g., 130, 140). For various embodiments, the active block of the set of first-type memory devices comprises an individual block of at least one first-type memory device (in the set of first-type memory devices) upon which the memory sub-system (e.g., the memory sub-system controller 115) is currently operating.

At operation 306, the processing device (e.g., 117) causes a portion (e.g., partial table or a fraction of a full table) of defect management data to be copied from at least one second-type memory device (e.g., 119), in the set of second-type memory devices, to at least one third-type memory device (e.g., 150) in the set of third-type memory devices, where the portion of the defect management data is associated with the active block identified by operation 304. As described herein, the portion of the defect management data can comprise raw bit error data (RBER) for the identified active block, code word error rate data for the identified active block, or both. For various embodiments, the set of third-type memory devices has faster access (e.g., read or write access) than the set of second-type memory devices. For instance, the set of second-type memory devices can comprise a DRAM device, and the set of third-type memory devices can comprise a SRAM device. Additionally, for some embodiments, the defect management data, stored on the second-type memory device, is associated with a plurality of blocks currently being operated upon by the processing device (e.g., 117), and the identified active block is an individual block of the plurality of blocks currently being accessed by the processing device (e.g., 117).

At operation 308, the processing device (e.g., 117) accesses the portion of the defect management data, stored on the at least one third-type memory device, when performing an individual operation in connection with the identified active block. Access of the portion of the defect management data can comprise read or write access. Write access to the portion of the defect management data stored on the at least one third-type memory device can be passed through to the at least one second-type memory device, the set of first-type memory devices, or both. For some embodiments, the individual operation comprises a defect management operation performed in connection with the identified active block. For instance, this defect management operation can be performed in connection with a read or write access operation being performed on the identified active block. For some embodiments, the portion of the defect management data comprises defect metadata for the identified active block, and the individual operation comprises a metadata access operation. Eventually, after operation 308, the method 300 can return to operation 304 to identify the next active block of the first-type memory device (e.g., 130, 140), and perform operations 306 and 308 with respect to the next active block.

Referring now to the method 400 of FIG. 4, at operation 402, a processing device (e.g., the processor 117 of the memory sub-system controller 115) analyzes data access activity of the set of non-volatile memory devices (e.g., 130, 140). For some embodiments, each of the non-volatile memory devices is one that does not have an erase-before rewrite requirement. The set of non-volatile memory devices can comprise at least one of a FeRAM device, a RRAM device, a three-dimensional cross-point memory device, or a phase-change memory device. For some embodiments, operation 402 comprises analyzing a set of data requests (e.g., read or write requests) received by the memory sub-system (e.g., 110) from a host system (e.g., 120). As described herein, analyzing the set of data requests can determine a set of workload characteristics of the memory sub-system.

At operation 404, the processing device (e.g., 117) determines, based on analyzing the data access activity at operation 402, whether a sequential mode data operation is being performed on the set of non-volatile memory devices (e.g., 130, 140). Depending on the embodiment, the sequential mode data operation can comprise at least one of a set of sequential host write operations or a set of sequential host read operations. For example, a sequential host write operation can comprise sequential (or random) host writes by a host system (e.g., 120), where writes can be serialized and localized to an active block of the memory device (e.g., 130, 140). As another example, a sequential host read operation cam comprise sequential host reads by a host system (e.g., 120), where reads can be serialized and localized to an active block of the memory device (e.g., 130, 140). The sequential mode data operation can comprise at least one of a set of background read operations or a set of background write operations. For example, a background read operation can be a read operation performed during a garbage collection operation, a refresh operation, or a defect management operation performed on an active block. Likewise, a background write operation can comprise a write operation performed during a garbage collection operation, a refresh operation, or a defect management operation performed on an active block. Accordingly, the sequential mode data operation can comprise at least one of a set of garbage collection operations, a set of refresh operations, or a set of defect management operations.

In response to determining (at operation 404) that the sequential mode data operation is being performed on the set of non-volatile memory devices (e.g., 130, 140), the processing device (e.g., 117) performs operations 406, 408, and 410.

At operation 406, the processing device (e.g., 117) identifies an active block of the set of non-volatile memory devices (e.g., 130, 140). For various embodiments, the active block of the set of non-volatile memory devices comprises an individual block of at least one non-volatile memory device (in the set of non-volatile memory devices)

upon which the memory sub-system (e.g., the memory sub-system controller 115) is currently operating.

At operation 408, the processing device (e.g., 117) causes a portion (e.g., partial table or a fraction of a full table) of defect management data to be copied to at least one first-type volatile memory device (e.g., 150), in the set of first-type volatile memory devices, from at least one second-type volatile memory device (e.g., 119) in the set of second-type volatile memory devices, where the portion of the defect management data is associated with the active block identified by operation 406. As described herein, the portion of the defect management data can comprise raw bit error data (RBER) for the identified active block, code word error rate data for the identified active block, or both. For various embodiments, the set of first-type volatile memory devices has faster access (e.g., read or write access) than the set of second-type volatile memory devices. For instance, the set of first-type memory devices can comprise a SRAM device, and the set of second-type memory devices can comprise a DRAM device. Additionally, for some embodiments, the defect management data, stored on the second-type volatile memory device, is associated with a plurality of blocks currently being operated upon by the processing device (e.g., 117), and the identified active block is an individual block of the plurality of blocks currently being accessed by the processing device (e.g., 117).

At operation 410, the processing device (e.g., 117) accesses the portion of the defect management data, stored on the at least one first-type volatile memory device, when performing an individual operation in connection with the identified active block. Access of the portion of the defect management data can comprise read or write access. Write access to the portion of the defect management data stored on the at least one first-type volatile memory device can be passed through to the at least one second-type volatile memory device, the set of non-volatile memory devices (for persistent storage), or both. For some embodiments, the individual operation comprises a defect management operation performed in connection with the identified active block. For instance, this defect management operation can be performed in connection with a read or write access operation being performed on the identified active block. For some embodiments, the portion of the defect management data comprises defect metadata for the identified active block, and the individual operation comprises a metadata access operation. Eventually, after operation 410, the method 400 can return to operation 406 to identify the next active block of the first-type memory device (e.g., 130, 140), and perform operations 408 and 408 with respect to the next active block.

Referring now to the method 500 of FIG. 5, the method 500 represents a method that is similar to the method 300 described herein with respect FIG. 3 but performed with respect to individual blocks. In particular, at operation 502, a processing device (e.g., the processor 117 of the memory sub-system controller 115) determines whether a sequential mode data operation is being performed on an individual block (e.g., active block) on a set of first-type memory devices (e.g., 130, 140). In response to determining (at operation 502) that the sequential mode data operation is being performed on the set of first-type memory devices (e.g., 130, 140), the processing device (e.g., 117) performs operations 504 and 506. At operation 504, the processing device (e.g., 117) causes a portion (e.g., partial table or a fraction of a full table) of defect management data to be copied from at least one second-type memory device (e.g., 119), in the set of second-type memory devices, to at least one third-type memory device (e.g., 150) in the set of third-type memory devices, where the portion of the defect management data is associated with the individual block. At operation 506, the processing device (e.g., 117) accesses the portion of the defect management data, stored on the at least one third-type memory device, when performing an individual operation in connection with the identified active block.

FIGS. 6A and 6B provide an interaction diagram illustrating interactions between components of a computing environment in the context of some embodiments in which a method for copying a portion of defect management data for a block of a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a local memory (e.g., 119), a memory device for (storing) one or more portions of defect management data (hereafter, memory device for portion(s) of DM data) (e.g., 150), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIGS. 6A and 6B, the host system can include the host system 120, the memory sub-system controller can include the memory sub-system controller 115, the local memory can include the local memory 119, and the memory device can include the memory device 150.

As shown in FIG. 6A, at operation 602, the host system 120 sends one or more data access requests (e.g., read or write data requests) to the memory sub-system 110. At operation 610, the memory sub-system controller 115 receives the one or more data access requests to be processed. For various embodiments, the memory sub-system controller 115 processes the one or more data access requests and responds to the host system 120 accordingly. At operation 612, the memory sub-system controller 115 determines whether a sequential mode data operation is being performed on a set of first-type memory devices (e.g., 130, 140). As described herein, this determination can be determined based on analyzing the one or more data access requests received by the memory sub-system 110 from the host system 120, which can determine a set of workload characteristics of the memory sub-system. In response to determining (at operation 612) that the sequential mode data operation is being performed on the set of first-type memory devices (e.g., 130, 140), at operation 614, the memory sub-system controller 115 identifies an active block of the set of first-type memory devices (e.g., 130, 140). At operation 616, the memory sub-system controller 115 causes a portion (e.g., partial table or a fraction of a full table) of defect management data to be copied from the local memory 119 to the memory device 150, where the portion of the defect management data is associated with the active block identified by operation 614. At operation 630, the local memory 119 provides the memory sub-system controller 115 with access to the portion of the defect management data and, at operation 640, the memory device 150 stores a copy of the portion of the defect management data. Subsequently, at operation 618, the memory sub-system controller 115 accesses the portion of the defect management data, stored on the memory device 150, when performing an individual operation in connection with the identified active block. Accordingly, at operation 642, the memory device 150 provides the memory sub-system controller 115 with access to the portion of the defect management data stored on the memory device 150. In doing so, the memory sub-system controller 115 can avoid accessing the local memory 119 for the portion of the defect management data associated with the identified active block.

Figure 7:
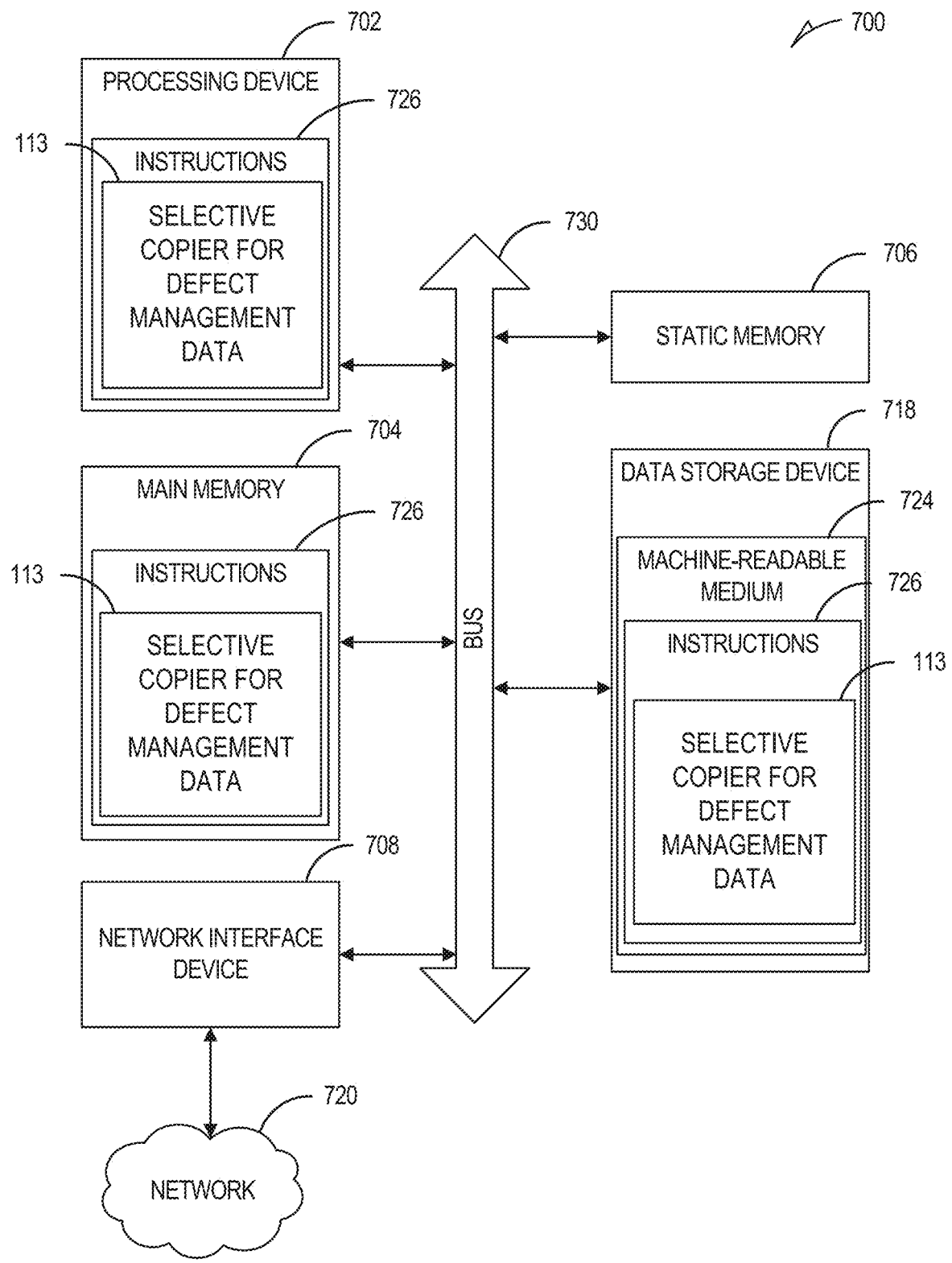
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to copying a portion of defect management data for a block of a memory device based on activity of the memory device as described herein (e.g., the selective copier 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a set of first-type volatile memory devices;
    a set of second-type volatile memory devices;
    a set of non-volatile memory devices; and
    a processing device, operatively coupled to the set of non-volatile memory devices, configured to perform operations comprising:
        analyzing data access activity of the set of non-volatile memory devices;
        determining, based on the analyzing the data access activity, whether a sequential mode data operation is being performed on the set of non-volatile memory devices; and
        in response to determining that the sequential mode data operation is being performed on the set of non-volatile memory devices:
            identifying an active block of the set of non-volatile memory devices;
            causing a portion of defect management data to be copied to at least one first-type memory device, in the set of first-type volatile memory devices, from at least one second-type volatile memory device in the set of second-type volatile memory devices, the portion of the defect management data being associated with the identified active block; and
            accessing the portion of defect management data, stored on the at least one first-type volatile memory device, when performing an individual operation in connection with the identified active block.

2. The system of claim 1, wherein the individual operation comprises a defect management operation.

3. The system of claim 1, wherein the sequential mode data operation comprises at least one of a set of sequential host write operations or a set of sequential host read operations.

4. The system of claim 1, wherein the sequential mode data operation comprises at least one of a set of background read operations or a set of background write operations.

5. The system of claim 1, wherein the sequential mode data operation comprises at least one of a set of garbage collection operations, a set of refresh operations, or a set of defect management operations.

6. The system of claim 1, wherein the portion of the defect management data comprises defect metadata for the identified active block, and the individual operation comprises a metadata access operation.

7. The system of claim 1, wherein the portion of the defect management data comprises raw bit error data for the identified active block.

8. The system of claim 1, wherein the portion of the defect management data comprises code word error rate data for the identified active block.

9. The system of claim 1, wherein the set of first-type volatile memory devices has faster read access than the set of second-type volatile memory devices.

10. The system of claim 9, wherein the set of first-type volatile memory devices comprises a static random access memory (SRAM) device.

11. The system of claim 10, wherein the set of second-type volatile memory devices comprises a dynamic random access memory (DRAM) device.

12. The system of claim 1, wherein the set of non-volatile memory devices comprises a three-dimensional cross-point memory device.

13. The system of claim 12, wherein the identified active block comprises a block of the three-dimensional cross-point memory device.

14. The system of claim 1, wherein the defect management data, stored on the set of second-type volatile memory devices, is associated with a plurality of blocks currently being operated upon by the processing device, and the identified active block is an individual block of the plurality of blocks currently being accessed by the processing device.

15. A method comprising:
    determining whether a sequential mode data operation is being performed on an individual block stored on a set of first-type memory devices of a memory sub-system, the memory sub-system comprising a set of second-type memory devices and a set of third-type memory devices; and
    in response to determining that the sequential mode data operation is being performed on the individual block:
        causing a portion of defect management data to be copied from at least one second-type memory device, in the set of second-type memory devices, to at least one third-type memory device in the set of third-type memory devices, the portion of the defect management data being associated with the individual block; and
        accessing the portion of the defect management data, stored on the at least one third-type memory device, when performing an individual operation in connection with the individual block.

16. The method of claim 15, wherein the sequential mode data operation comprises at least one of a set of sequential host write operations or a set of sequential host read operations.

17. The method of claim 15, wherein the sequential mode data operation comprises at least one of a set of background read operations or a set of background write operations.

18. The method of claim 15, wherein the sequential mode data operation comprises at least one of a set of garbage collection operations, a set of refresh operations, or a set of defect management operations.

19. The method of claim 15, wherein the portion of the defect management data comprises defect metadata for the individual block, and the individual operation comprises a metadata access operation.

20. A non-transitory computer-readable storage medium comprising instructions that, when executed by a processing device, cause the processing device to perform operations comprising:
  determining whether a sequential mode data operation is being performed on a set of first-type memory devices of a memory sub-system, the memory sub-system comprising a set of second-type memory devices and a set of third-type memory devices; and
  in response to determining that the sequential mode data operation is being performed on the set of first-type memory devices:
    identifying an active block of the set of first-type memory devices;
    causing a portion of defect management data to be copied from at least one second-type memory device, in the set of second-type memory devices, to at least one third-type memory device in the set of third-type memory devices, the portion of the defect management data being associated with the identified active block; and
    accessing the portion of the defect management data, stored on the at least one third-type memory device, when performing an individual operation in connection with the identified active block.

* * * * *